Patented Mar. 26, 1940

2,194,665

UNITED STATES PATENT OFFICE 2,194,665

GLYCERIN RECOVERY PROCESS

Nathan M. Mnookin, Kansas City, Mo., assignor to Speas Development Co., a corporation of Missouri No Drawing. Application March 19, 1938, Serial No. 196,959

11 Claims. (Cl. 260—637)

This invention relates to methods of recovering polyhydric alcohols from aqueous solutions containing the same and more particularly to methods of recovering glycerol from such solutions.

In my prior application Serial No. 192,397, filed February 24, 1938, I described and claimed methods for removing glycerin from concentrated glycerin-fermented mash or wort or from concentrated distillers' slop as well as from other aqueous solutions containing glycerin by means of certain novel selective solvents therein described.

In accordance with my present invention I have found that glycerin may be removed from aqueous glycerin solutions by means of a combination of solvents which is totally or partially immiscible in water. One of the solvents of this combination, hereinafter designated the primary solvent, is a good preferential solvent for glycerin and may be, and generally is, miscible with water. The other solvent or solvents, hereinafter designated the secondary solvent, is a solvent or mixture of solvents which is at least partially and is preferably totally immiscible in water and at the same time is a selective solvent for the primary solvent for glycerin in the combination. The secondary solvent in the solvent combination used in accordance with my present invention may also be a solvent for glycerin, although this is not essential. However, if the secondary solvent in the solvent combination is also a solvent for glycerin, the quantity of glycerin removed from an aqueous glycerin solution by a single extraction is greater than when the secondary solvent is not a solvent for glycerin.

The solvent combinations used in accordance with the present invention are particularly adapted for use in the recovery of glycerin from aqueous glycerin solutions which are free from dissolved salts or contain only small quantities thereof. They are also particularly adapted for use in the recovery of glycerin from a glycerol-fermented mash or wort or distillers' slop which has not been concentrated or only slightly concentrated until the dissolved solids or salts content is brought not above 5%. They may, of course, also be employed with more concentrated materials or those having a higher concentration of dissolved solids or salts.

The primary or water miscible glycerin solvent which may be used in the combination of solvents in accordance with my present invention may be, for example, certain alcohols of a higher molecular weight than ethyl alcohol, and certain derivatives of mono- and polyhydric alcohols, and in particular, alcohol ethers and esters; for example, isopropyl alcohol, n-propyl alcohol, secondary butyl alcohol, isobutyl alcohol, furfuryl alcohol, tetrahydrofurfuryl alcohol, the glycol ethers such as ethylene glycol monomethyl ether, ethylene glycol monoethyl ether, ethylene glycol monobutyl ether, diethylene glycol monoethyl ether, diethylene glycol monobutyl ether and the like, and the esters such as n-propyl lactate, isopropyl lactate, mono- and diacetin and the like, or mixtures thereof.

The secondary solvent which may be used in the combination of solvents in accordance with my present invention also may be, for example, certain relatively water-immiscible alcohols of a higher molecular weight than ethyl alcohol, and certain derivatives of relatively high molecular weight alcohols, and in particular, alcohol ethers and esters. Of these second solvents I include, for example, n-butyl alcohol, tertiary amyl alcohol, ethyl butyl alcohol, octyl alcohol, methyl amyl alcohol, methyl-n-butyl carbinol, isopropyl ether, dichlorethyl ether, benzyl alcohol, benzyl ether, butyl lactate, n-propyl lactate, triacetin and the like or any mixture thereof.

The combination of the primary solvent or mixture thereof with the secondary solvent or mixture of secondary solvents is wholly or largely immiscible with water and exercises a preferential affinity or selective solvent capacity for glycerin in aqueous glycerin solutions.

The proportions of the primary and secondary solvents in the combination may vary somewhat and may readily be arrived at experimentally. By a preliminary test on a small portion of the glycerin-containing solution with a solvent mixture used in accordance with my invention the quantity of each solvent to be used in the mixture to obtain successful extractions may be readily determined. In general, the proportions of the primary and secondary solvents in the combination are determined by the particular solvents used and by the character of the aqueous glycerin containing solutions being treated for the recovery of glycerin. I have obtained, for example, satisfactory glycerin recovery from an aqueous glycerin solution containing no salts by using a combination of solvents consisting of one part by volume of isopropyl alcohol and two parts by volume of n-butyl alcohol. I have found that the quantity of isopropyl alcohol in the combination may be increased up to about five parts by volume of isopropyl alcohol to about one part by volume of n-butyl alcohol by the addition of some soluble salts to the aqueous glycerin-containing solution. I have also obtained satisfactory results with, for example, the following combinations of solvents. (The term parts indicates parts by volume in the following examples.)

| Primary solvent | Secondary solvent |
|---|---|
| 2 parts ethylene glycol mono-butyl ether. | 1 part n-butyl alcohol. |
| 1 part furfuryl alcohol. | 1 part isopropyl ether. |
| 1 part tetrahydrofurfuryl alcohol. | 1 part isopropyl ether. |
| 1 part isopropyl alcohol. | 2 parts tertiary-amyl alcohol. |
| 1 part isopropyl alcohol. | 1 part ethyl butyl alcohol. |
| 2 parts isopropyl alcohol. | 1 part isopropyl ether. |
| 2 parts n-propyl lactate. | 1 part isopropyl ether. |
| 2 parts monoacetin. | 1 part isopropyl ether. |
| 2 parts diacetin. | 1 part ethyl butyl alcohol. |
| 1 part diacetin. | 3 parts n-butyl alcohol. |
| 1 part diacetin. | 2 parts benzyl alcohol. |
| 2 parts monoacetin. | 1 part triacetin. |

In carrying out the processes embodying my present invention, an aqueous glycerin-containing solution or a glycerin-containing residue such as, for example, a glycerol fermented mash or wort is mixed with about an equal volume of one of the solvent mixtures enumerated above. The mixture is agitated or stirred in any suitable vessel either with or without the application of heat, as desired. If heat is used, a pressure-tight vessel must be employed. After thorough agitation the mixture is allowed to stand until a separation of the material into two phases takes place. The extract phase contains the glycerin solvent mixture and the extracted glycerin with little or in some cases, substantially no water, depending upon the solvent mixture employed and the aqueous phase contains the treated material from which the glycerin has been extracted. The extract phase containing the extracted glycerin may then be removed in any desirable manner; for example, by decantation or the like. The extraction may, if desired, be repeated a number of times until all or substantially all of the glycerin is removed from the solution being treated. The total extracts may then be combined and the glycerin separated from the solvent or solvents in any desirable manner as, for example, by distillation or by the addition of an agent which throws out or discharges the glycerin from solution such as, for example, isopropyl ether, dichlorethyl ether and the like.

In the formation of the two phases mentioned above, the glycerin passes from the concentrate or water phase to the immiscible or substantially immiscible solvent mixture or extract phase. It is, of course, obvious that with given relative proportions of solvent mixture to material treated, the proportion of glycerin passing from the water phase depends in a large measure on the degree of selectivity of the particular glycerin solvent mixture used as well as upon the quantity thereof. Thus, with certain mixtures of solvents larger amounts of glycerin may be removed from the aqueous phase than with like proportions of other solvent mixtures. The extent of selectivity or preferential affinity for glycerin in the solvent mixtures used in accordance with my invention depends upon the nature of the solvents used. In general, I have found that if the solvent mixture contains a solvent or solvents having a propyl ($C_3H_7$) radical, these solvent mixtures possess the greatest selectivity or affinity for glycerin. Thus, for example, in extracting glycerin from a glycerol fermented mash and/or distillers' slop, the best results have been attained with, for example, a solvent mixture containing isopropyl alcohol and n-butyl alcohol, isopropyl alcohol and isopropyl ether or the like.

The following examples are illustrative of the methods for removing glycerin in accordance with my invention and it is, of course, to be understood that my invention is not to be construed as limited to the specific details of the methods described.

Example 1

350 parts by weight of blackstrap molasses in 1250 parts by weight of water, to which has been added 150 parts by weight of sodium sulfite, are fermented to completion with a yeast, forming substantial proportions of glycerin. The fermented mixture is distilled to remove alcohol, acetaldehyde and other volatile constituents. The residue is mixed with about an equal volume of a solvent mixture formed by mixing 1 part of isopropyl alcohol and 2 parts of n-butyl alcohol and permitted to stand, whereupon a separation of phases takes place. The extract phase containing the glycerin is removed. The residue may be then extracted about three or four more times with about an equal volume of fresh solvent mixture in each extraction, and the extracts removed. The extracts, which are substantially water-free, are collected in a suitable vessel and the solvent removed therefrom by a simple distillation. About 50 parts by weight of a light, straw-colored glycerin remains in the vessel containing a relatively small per cent of impurities (including water). This is equivalent to a yield of approximately 75 to 85% of the glycerin present in the material treated. The resulting glycerin is of sufficient purity for direct use for many technical purposes.

Example 2

100 parts by volume of an aqueous glycerin solution free from salts containing about 5% by weight of glycerin are mixed in a suitable vessel with about an equal volume of a solvent mixture consisting of one-third by volume of isopropyl alcohol and two-thirds by volume of n-butyl alcohol. The separation of the extract and aqueous phases takes place as described in Example 1, and the extract phase is removed in any desirable manner as described above. A single extraction removes about 50% of the glycerin from the solution. With about three or four extractions substantially all of the glycerin may be removed from the aqueous solution.

The processes embodying my invention are practical and economical and secure an unusually high recovery which closely approaches the quantities of glycerin present in the glycerin-containing residues or other aqueous solutions treated. The glycerine is separated out in the form of an extract of high glycerin content which is low in water and in some cases almost free from water, and is hence unaccompanied by any substantial quantities of water-soluble salts or non-glycerin compounds which may be present in the material treated. Moreover, by carrying out the processes in accordance with my invention I am able to obtain directly glycerin of high concentration and having a relatively high degree of purity, under suitable conditions sufficiently pure for technical uses without further concentration or treatment.

In the processes described herein, the solvent mixtures used in accordance with my present invention may, if desired, be added in small portions and with agitation after the addition of each portion. Also, if desired, the processes described herein may be carried out continuously as, for example, by counter-current contacting of an aqueous glycerin solution or glycerol-fermented material with the immiscible or partially immiscible solvent mixtures in any of the known counter-current extraction apparatus. The extraction of the glycerin from the aqueous solutions or glycerin-containing residues as described above may be carried out either hot or cold as desired, and at ordinary atmospheric pressures or at pressures either above or below atmospheric.

The processes embodying my invention may also be used to remove other polyhydric alcohols, such as, for example, glycol, diethylene glycol, propylene glycol, etc. from aqueous solutions containing the same. In the instance where it is desired to remove a polyhydric alcohol, such as a glycol, from an aqueous solution containing the same, any of the solvent mixtures enumerated above and like solvent mixtures may be used to effect the extraction or removal.

I claim:

1. In the process of recovering glycerin from an aqueous glycerin-containing solution, the step of treating the solution with a substantially water-immiscible combination of solvents to extract glycerin, one of the solvents of said combination being an organic compound selected from the class consisting of alcohols of higher molecular weight than ethyl alcohol, ethers and esters which is a solvent for glycerin at room temperature and another, different from said first named solvent, being an organic compound substantially immiscible in water selected from the class consisting of alcohols of higher molecular weight than ethyl alcohol, ethers and esters and at the same time a solvent for said first named solvent.

2. In the process of recovering glycerin from a glycerol-fermented mash, the step of treating the mash with a substantially water-immiscible combination of solvents to extract the glycerin, one of the solvents of said combination being an organic compound selected from the class consisting of alcohols of higher molecular weight than ethyl alcohol, ethers and esters which is a solvent for glycerin at room temperature and another, different from said first named solvent, being an organic compound substantially immiscible with water, selected from the class consisting of alcohols of higher molecular weight than ethyl alcohol, ethers and esters and at the same time a solvent for said first named solvent.

3. In the process of recovering glycerin from a distillers' slop containing glycerin, the step of treating the slop with a substantially water-immiscible combination of solvents to extract the glycerin, one of the solvents of said combination being an organic compound selected from the class consisting of alcohols of higher molecular weight than ethyl alcohol, ethers and esters which is a solvent for glycerin at room temperature and another, different from said first named solvent, being an organic compound substantially immiscible in water selected from the class consisting of alcohols of higher molecular weight than ethyl alcohol, ethers and esters which is a solvent for said first named solvent.

4. In the process of recovering glycerin from a glycerin-containing fermentation liquid, the step of treating the liquid with a substantially water-immiscible combination of solvents to extract the glycerin, one of the solvents of said combination being an organic compound selected from the class consisting of alcohols of higher molecular weight than ethyl alcohol, ethers and esters which is a solvent for glycerin at room temperature and another, different from said first named solvent, being an organic compound substantially immiscible in water selected from the class consisting of alcohols of higher molecular weight than ethyl alcohol, ethers and esters and at the same time a solvent for said first named solvent.

5. In the process of recovering glycerin from a substantially unconcentrated glycerol-fermented blackstrap molasses mash, the step of treating the mash with a substantially water-immiscible combination of solvents to extract the glycerin, one of the solvents of said combination being an organic compound selected from the class consisting of alcohols of higher molecular weight than ethyl alcohol, ethers and esters which is a solvent for glycerin, at room temperature and another, different from said first named solvent, being an organic compound substantially immiscible in water selected from the class consisting of alcohols of higher molecular weight than ethyl alcohol, ethers and esters which is a solvent for said first named solvent.

6. In the process of recovering glycerin from an aqueous glycerin-containing solution, the step of treating the solution with a substantially water-immiscible combination of solvents comprising essentially isopropyl alcohol and n-butyl alcohol to extract the glycerin.

7. In the process of recovering glycerin from an aqueous glycerin-containing solution, the step of treating the solution with a substantially water-immiscible combination of solvents comprising essentially ethylene glycol monobutyl ether and n-butyl alcohol to extract the glycerin.

8. In the process of recovering glycerin from an aqueous glycerin-containing solution, the step of treating the solution with a substantially water-immiscible combination of solvents comprising essentially isopropyl alcohol and isopropyl ether to extract the glycerin.

9. In the process of recovering glycerin from an aqueous glycerin solution, the step of treating the solution with a substantially water-immiscible combination of solvents consisting of 1 part by volume of isopropyl alcohol and 2 parts by volume of n-butyl alcohol to extract the glycerin.

10. In the process of recovering glycerin from a substantially unconcentrated glycerol-fermented blackstrap molasses mash, the step of treating the mash with a substantially water-immiscible combination of solvents consisting of 1 part by volume of isopropyl alcohol and 2 parts by volume of n-butyl alcohol to extract the glycerin.

11. In the process of recovering glycerin from a glycerin-containing material of the class consisting of aqueous glycerin solutions, glycerol-fermented mash and distillers' slop, the step of treating the material with a substantially water-immiscible combination of solvents to extract glycerin, one of the solvents of said combination being an oxygenated organic compound selected from the class consisting of alcohols of higher molecular weight than ethyl alcohol, ethers and esters which is a solvent for glycerin at room temperature and another, different from said first named solvent, being an organic oxygenated compound substantially immiscible in water selected from the class consisting of alcohols of higher molecular weight than ethyl alcohol, ethers and esters and at the same time a solvent for said first named solvent.

NATHAN M. MNOOKIN.

CERTIFICATE OF CORRECTION.

Patent No. 2,194,665. March 26, 1940.

NATHAN M. MNOOKIN.

It is hereby certified that error appears in the printed specification of the above numbered patent requiring correction as follows: Page 3, first column, line 54, claim 3, strike out "miscible combination of solvents consisting of 1" and insert instead--a distillers' slop containing glycerin, the step of--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.